Figure 7:
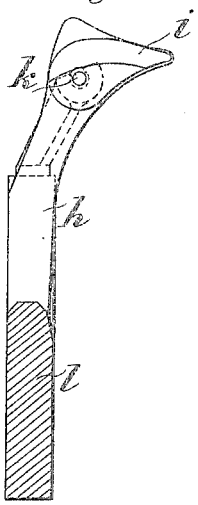

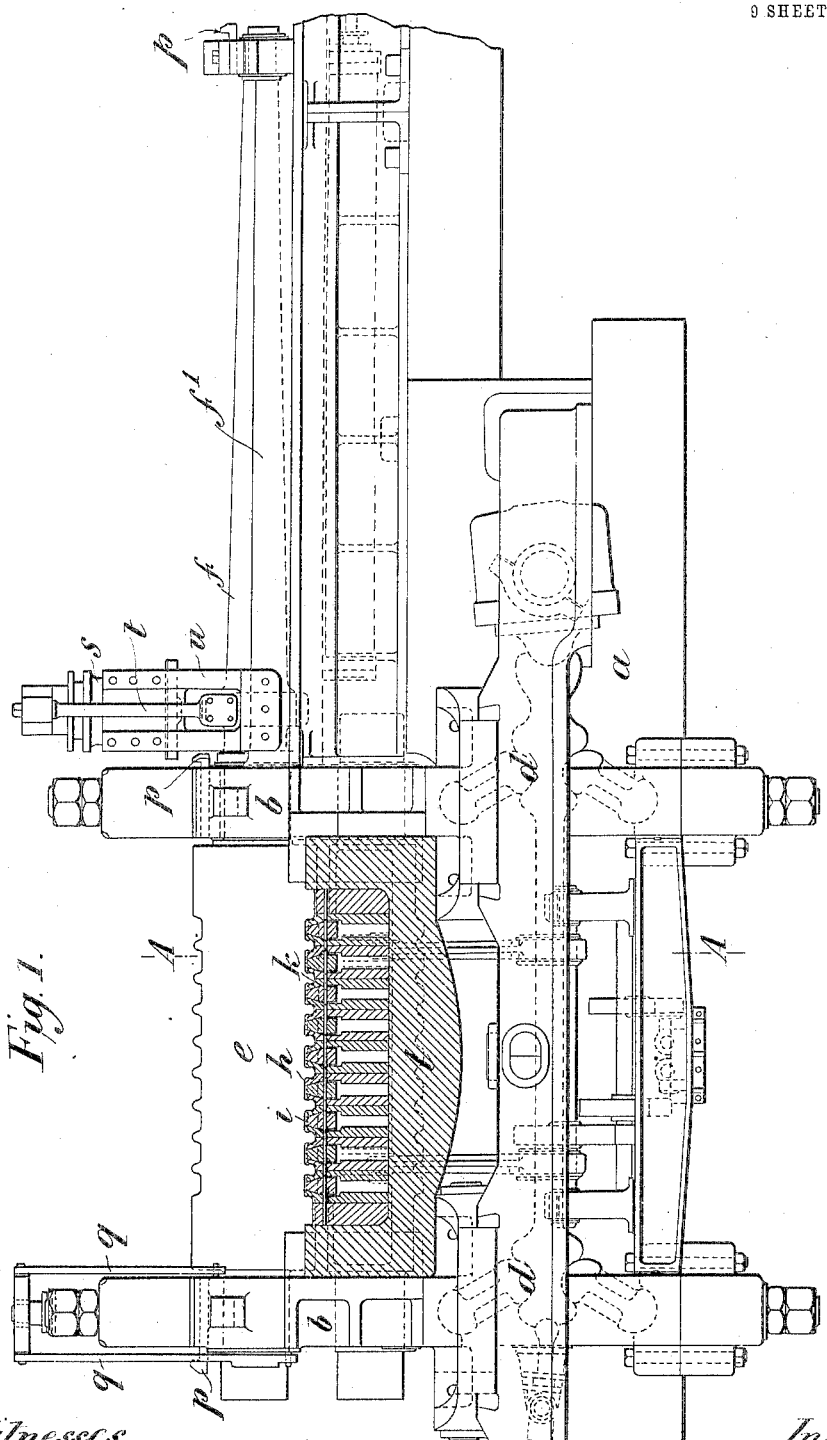

No. 794,092. PATENTED JULY 4, 1905.
E. GEARING & W. RAINFORTH.
APPARATUS FOR THE MANUFACTURE OF STEAM BOILER FURNACES AND FLUES.
APPLICATION FILED MAR. 12, 1904.

9 SHEETS—SHEET 2.

Witnesses.
Arthur Woosnam
W. Henry Simms

Inventors
Ernest Gearing
William Rainforth
Per M. Wydwise
Attorney.

No. 794,092. PATENTED JULY 4, 1905.
E. GEARING & W. RAINFORTH.
APPARATUS FOR THE MANUFACTURE OF STEAM BOILER FURNACES AND FLUES.
APPLICATION FILED MAR. 12, 1904.

9 SHEETS—SHEET 3.

Witnesses
Inventors
Attorney

No. 794,092. PATENTED JULY 4, 1905.
E. GEARING & W. RAINFORTH.
APPARATUS FOR THE MANUFACTURE OF STEAM BOILER FURNACES AND FLUES.
APPLICATION FILED MAR. 12, 1904.
9 SHEETS—SHEET 4.
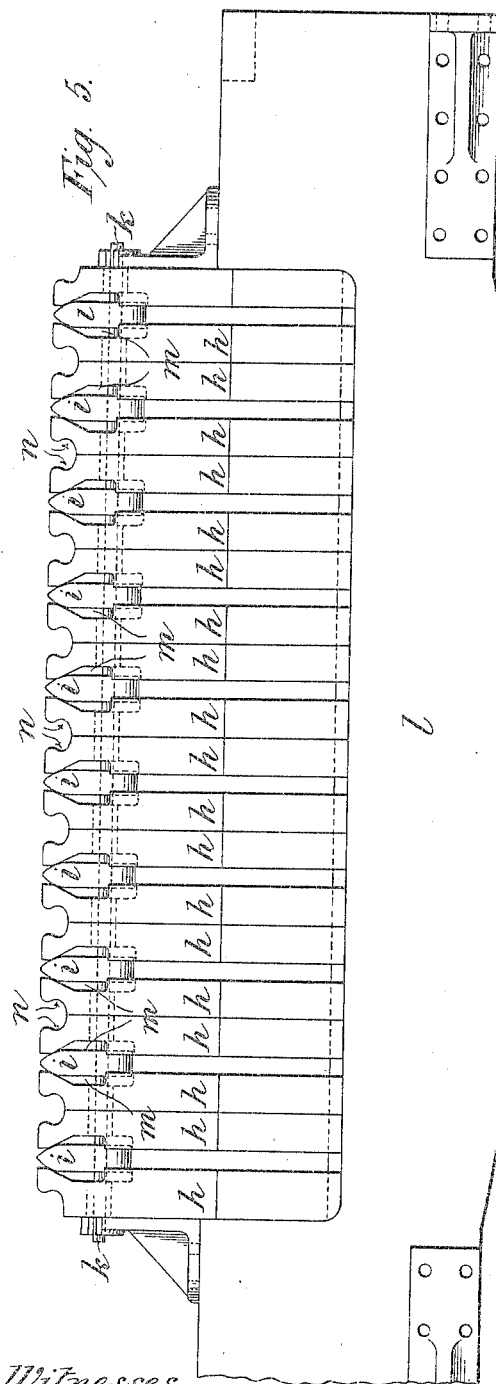
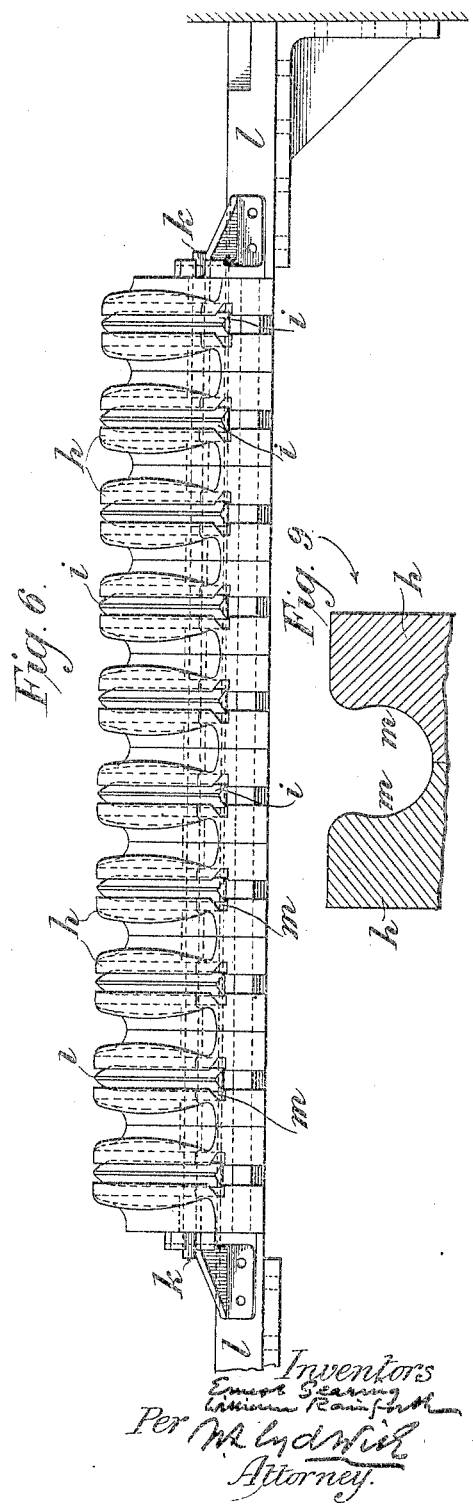

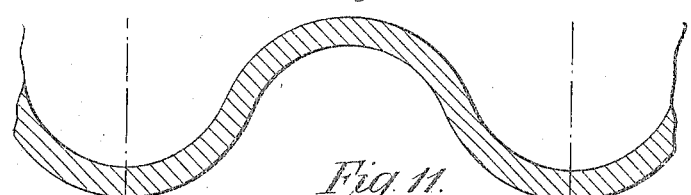
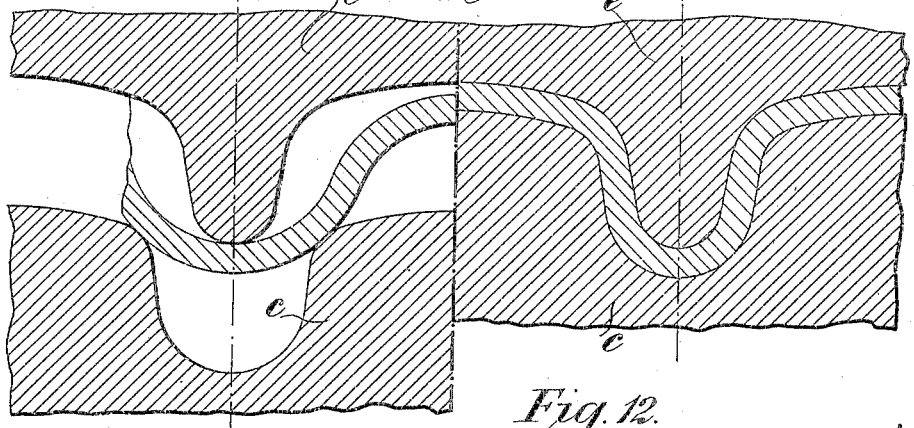
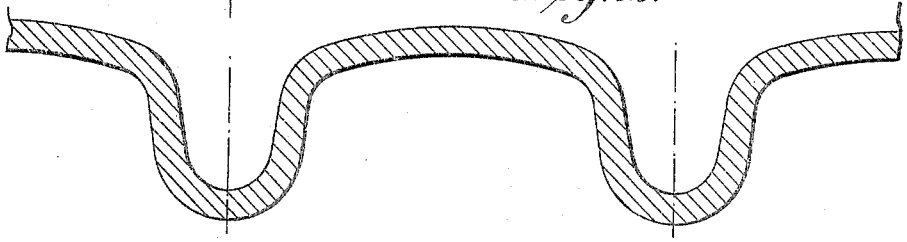

No. 794,092. PATENTED JULY 4, 1905.
E. GEARING & W. RAINFORTH.
APPARATUS FOR THE MANUFACTURE OF STEAM BOILER FURNACES AND FLUES.
APPLICATION FILED MAR. 12, 1904.
9 SHEETS—SHEET 6.
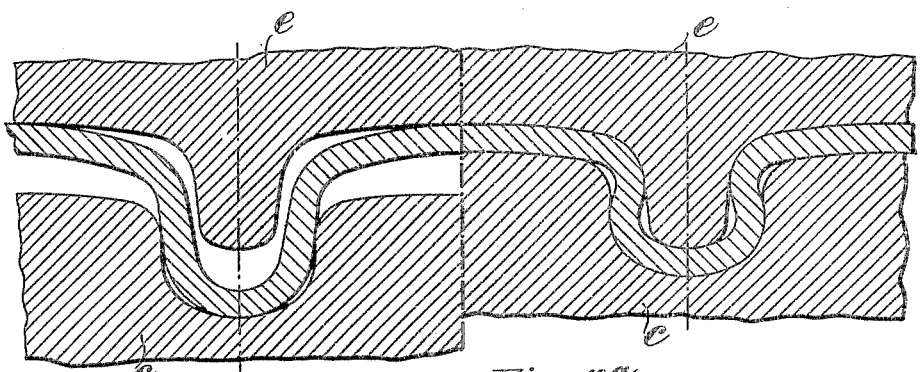
Fig. 13.
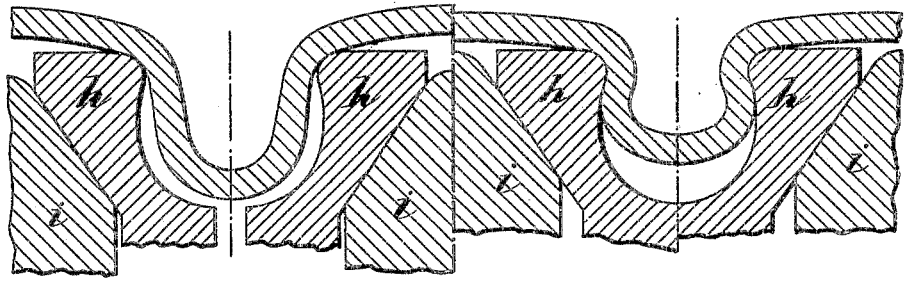
Fig. 13ª.
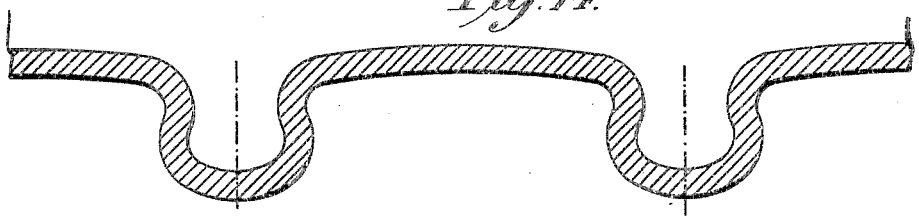
Fig. 14.

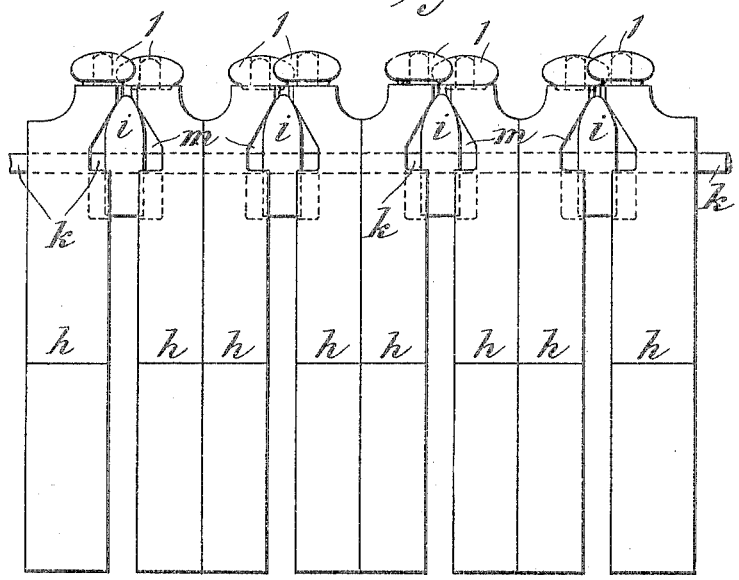
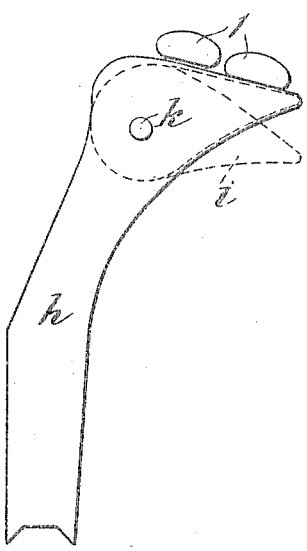
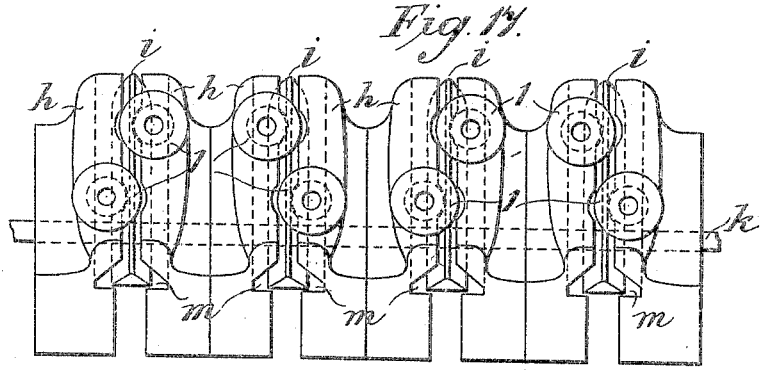

No. 794,092.
PATENTED JULY 4, 1905.
E. GEARING & W. RAINFORTH.
APPARATUS FOR THE MANUFACTURE OF STEAM BOILER FURNACES AND FLUES.
APPLICATION FILED MAR. 12, 1904.
9 SHEETS—SHEET 8.
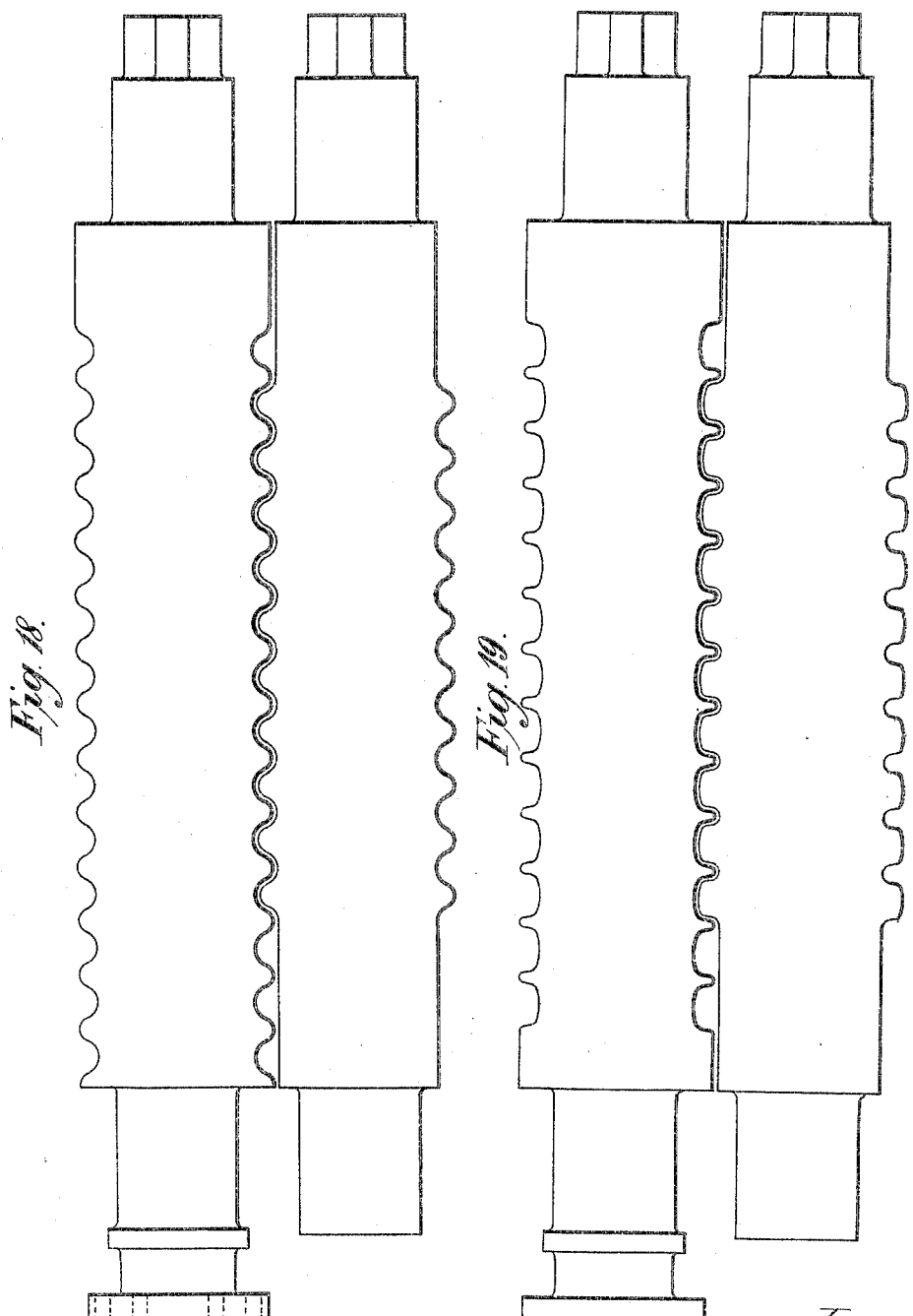

No. 794,092. PATENTED JULY 4, 1905.
E. GEARING & W. RAINFORTH.
APPARATUS FOR THE MANUFACTURE OF STEAM BOILER FURNACES AND FLUES.
APPLICATION FILED MAR. 12, 1904.

9 SHEETS—SHEET 9.

No. 794,092. Patented July 4, 1905.

UNITED STATES PATENT OFFICE.

ERNEST GEARING, OF HARROGATE, AND WILLIAM RAINFORTH, OF LEEDS, ENGLAND.

APPARATUS FOR THE MANUFACTURE OF STEAM-BOILER FURNACES AND FLUES.

SPECIFICATION forming part of Letters Patent No. 794,092, dated July 4, 1905.

Application filed March 12, 1904. Serial No. 197,901.

*To all whom it may concern:*

Be it known that we, ERNEST GEARING, residing at Harrogate, and WILLIAM RAINFORTH, residing at Leeds, in the county of York, England, subjects of the King of Great Britain and Ireland, have invented Apparatus for the Manufacture of Steam-Boiler Furnaces and Flues, of which the following is a specification.

The present invention has reference to improvements in machinery or apparatus for converting the hollow strengthening portions or ribs (hereinafter called "hollow ridges") formed on a furnace or flue by a preliminary corrugating process to the required finished section—such, for example, as a hollow bulblike section—that is to say, a section wherein the side walls of a ridge are nearest to one another at a part intermediate between the outermost and innermost parts of the ridge. According thereto the ridges formed by a preliminary corrugating process are given the required finished shape by one or more sets of compound collapsible and expandible segmental dies or formers that are adapted, when in the collapsed condition, to enter the grooves or valleys between the hollow ridges on the exterior of the furnace or flue and are then during the rotation of the furnace or flue by suitably corrugated or ribbed internal and external main rolls expanded sidewise, so as to embrace the hollow ridges between them and simultaneously press the side portions of each ridge toward each other, the formation of the dies or formers being such as to form between each adjacent pair of dies or formers a space or groove corresponding in cross-sectional shape to that which it is desired to impart to each hollow ridge, so that by the continued rotation of the furnace or flue the whole of the hollow ridges thereon will be simultaneously pressed to the required finished shape and the valleys between them will be widened. A set of compound dies or formers is mounted in a holder or support between the housings. There may be a set at one side only or a set at both sides of the external roll. The main rolls are usually of such a formation that their action upon the tube-wall will cause rotation of the tube and reduce the depth of the hollow ridges from their summits to the bottoms of the valleys, and the compound dies or formers may then be caused to expand sidewise by movement of one of the main rolls toward the other.

In a machine or apparatus according to this invention means are provided whereby the internal corrugated roll can be moved toward and from the external corrugated roll and also longitudinally in relation thereto for the purpose of enabling a tube to be placed in position in the machine for being operated upon and to be removed therefrom. Means are also provided for holding the said internal roll in place when pressure is applied by the movement of the external roll.

In the accompanying illustrative drawings there is illustrated a machine or apparatus embodying the several features of invention hereinafter specified in the claiming clauses hereof.

Figure 2:
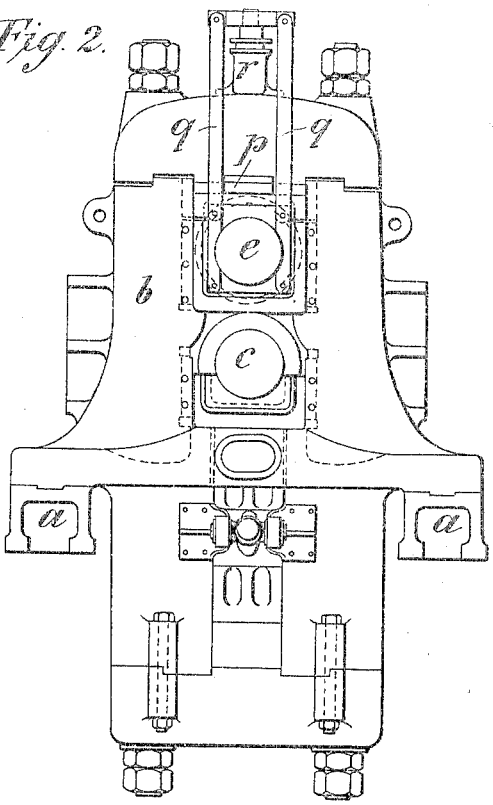
Figure 8:
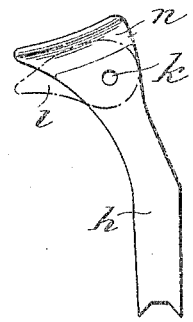
Figure 4:
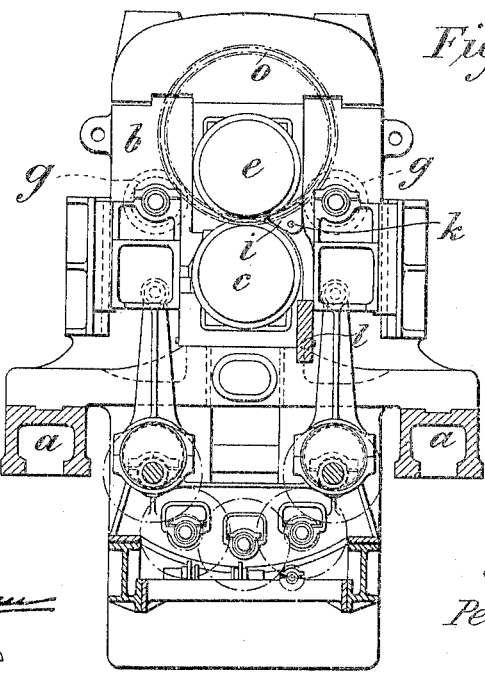
Figure 3:
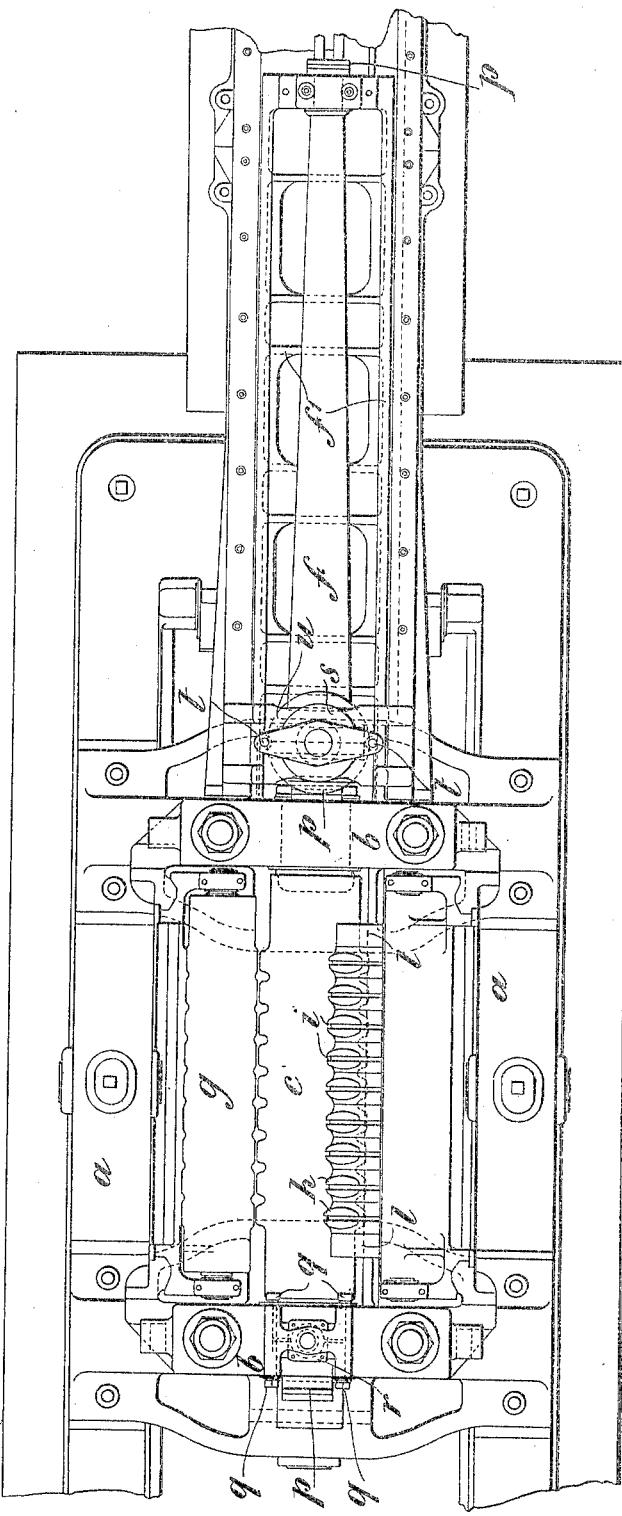

Figure 1 is a sectional side elevation; Fig. 2, an end elevation. Fig. 3 is a plan with some parts removed for the sake of clearness. Fig. 4 is a transverse section on the line A A, Fig. 1; and Figs. 5, 6, and 7 are respectively a rear elevation, plan, and transverse section of a set of expanded compound dies or formers. Figs. 8 and 9 are detail views hereinafter referred to. Fig. 10 is a sectional view of a corrugated partially-formed tube-wall. Fig. 11 shows the same formation, but indicates the application thereto of the rolls used to impart to the tube-wall shown in Fig. 10 the formation shown in Fig. 12. The left-hand and right-hand portions of the figure, respectively, show the rolls at the commencement and end of their operation. Fig. 12 is a similar view to Fig. 10 of the tube-wall after rolling between the rolls indicated in Fig. 11. Figs. 13 and 13ª illustrate the application of rolls and formers according to this invention. Fig. 13 illustrates the application of the rolls to the formation shown in Fig. 12. In the left-hand portion of the figure the rolls are shown in the positions they occupy at the commencement of their operation and in the right-hand portion they are shown in the positions they occupy at the end of their operation. Fig.

Figure 20:
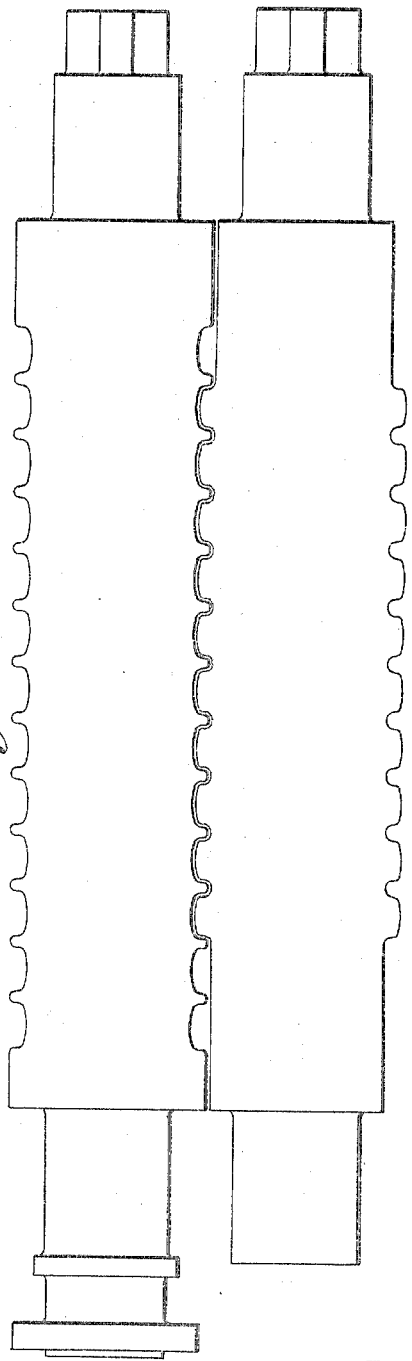

13ª illustrates the application of the formers to the formation shown in Fig. 12. In the left-hand portion of the figure the formers are shown in the positions they occupy at the commencement of their operation and in the right-hand portion they are shown in the positions they occupy at the end of their operation. Fig. 14 shows the formation resulting from the operation of the rolls and formers. Figs. 15, 16, and 17 are detail views of a modified former. Figs. 18, 19, and 20 illustrate in side elevation the pairs of rolls used in producing the formations shown in Figs. 10, 12, and 14, respectively.

$a$ is the bed-plate of the machine; $b$, the housings; $c$, a lower main corrugated roll adapted to be raised and lowered, as by hydraulically-operated toggle mechanism $d$; $e$, an upper corrugated roll; $f$, an extension thereof connecting it to a slide $f'$, adapted to be moved endwise by hydraulic means, and $g$ corrugated guide-rolls, all arranged after the manner commonly adopted in previous constructions of corrugating-machines. Each compound die or former (hereinafter referred to as a "former") may conveniently comprise two cheeks $h$, which are placed side by side and may be of the shape shown in Figs. 5 to 8. They are threaded, with a wedge-like tongue $i$ between those of each pair on a rod or spindle $k$, that is mounted in the end portions of a holder or support $l$, fixed between the housings $b$. The lower ends of the cheeks are recessed and rest and slide upon the holder or support $l$. Each tongue $i$ is pivoted on the rod or spindle $k$ in an opening formed by and between recesses $m$ in the cheeks $h$. The outer side of the upper portion of each cheek is formed with a groove $n$, such that the groove formed by and between the upper curved ends of the adjacent cheeks $h$ of two adjacent expanded formers approximately corresponds in cross-section at about the middle of its length to the external cross-sectional shape which it is desired to impart to the hollow ridges on the furnace or flue. As will be seen from Fig. 6, the groove formed between two such cheeks decreases in width toward its middle, so as to ease the entry and exit of the ridge therefrom. In the arrangement shown when the formers are collapsed the tongues $i$ project beyond the curved inner edges of the cheeks $h$, as indicated by dotted lines in Fig. 8, and rest upon the lower roll $c$. The arrangement is such that when the roll $c$ is raised in the usual way to grip between it and the roll $e$ the furnace or flue $o$, Fig. 4, and the said rolls $c$ and $e$ rotated so as to cause rotation of such furnace or flue the wedge-like tongues $i$ will be raised by the roll $c$, and the compound formers will be expanded and caused during the rotation of the furnace or flue to press the hollow ridges thereon to the required shape.

In some cases the formers are formed as shown in Figs. 15, 16, and 17, with rollers 1 mounted on studs carried by the cheeks in such positions that the rollers transmit the pressure to the sides of the ridges at those parts where the pressure is greatest.

The bearings for the upper main roll $e$ are held in place vertically by removable packing-pieces $p$, and the roll is adapted after removal of such packing-pieces to be lifted, as by hydraulic means, and held in the raised position while it is being moved endwise for passing it into and withdrawing it from a furnace or flue whose hollow ridges are to be finished to shape. The left-hand bearing is connected by links $q$ to the ram working in a cylinder $r$ on the housing, so that the bearing can be raised into such a position that it will receive the free end of the roll $e$ when the slide $f'$ is moved inward. When the roll $e$ has been slid into position over the bottom roll, it and its bearings are allowed to descend, and the packing-pieces $p$ are put back in place. For raising the roll $e$ the slide $f'$ is provided with a hydraulic cylinder $s$, the ram of which is connected by rods $t$ to a bearing or sling $u$, in which the extension $f$ of the roll can turn.

Before operating upon a furnace or flue tube by apparatus such as described the tube is preferably first rolled in stages to the sectional form shown in Fig. 12, the first rolling operation having formed deep and wide but not steep-sided corrugations, as shown in Fig. 10, and a subsequent rolling operation having applied pressure by means of internal and external rolls, as indicated in Fig. 11, (in a direction normal to the axis of the tube,) to the sides of the ridges or outward corrugations, so as to steepen the sides of the ridges and widen the intermediate valleys and give to the flue-wall the sectional form shown in Fig. 12. The effect of this second rolling operation is to somewhat deepen the ridges or corrugations and slightly decrease the smallest internal diameter of the furnace or flue and slightly increase its greatest external diameter.

The application of rolls and formers to the tube-wall of the form shown in Fig. 12 is illustrated in Figs. 13 and 13ª. It will be observed from Fig. 13 that the rolls $c$ and $e$ reduce the depth of the ridges or corrugations. They also have the effect of increasing the smallest internal diameter and slightly decreasing the greatest external diameter, the result being that the wall of the tube is caused to move a little toward the formers which are situated to one side of the rolls. Such movement, which is indicated in Fig. 13ª, enables the formers to be situated a little farther from the axis of the tube to be treated than would otherwise be the case, so that the movement apart of the cheeks by the wedges need not be great. The final formation of the tube-wall is shown in Fig. 14 produced by closing up the rolls and expanding the dies while the tube is rotated by the rolls.

What we claim is—

1. For the manufacture of steam-boiler furnaces or flues of the kind having outwardly-extending hollow ridges, a machine comprising corrugated rolls adapted to apply pressure to and feed a tube-wall between them and compound collapsible and expandible formers adapted to extend between and to act upon the two sides of individual hollow ridges already formed in the tube-wall and press the said sides toward each other, as set forth.

2. For the manufacture of steam-boiler furnaces and flues of the kind having outwardly-extending hollow ridges, a machine comprising a pair of rolls adapted to apply pressure to the wall of a corrugated tube and rotate the same, and compound collapsible and expandible formers located outside the tube between its hollow ridges and adapted to act upon the two sides of individual hollow ridges already formed in the wall and press the said sides toward each other, as set forth.

3. For the manufacture of steam-boiler furnaces and flues of the kind having outwardly-extending hollow ridges, a machine comprising a pair of rolls adapted to apply pressure to the wall of a corrugated tube and rotate the same, compound collapsible and expandible formers located outside the tube between its hollow ridges and adapted to act upon the two sides of individual hollow ridges already formed in the wall and press the said sides toward each other, the active faces of the former being of a cross-sectional shape corresponding to that to be imparted to the sides of the ridges, and a movable device adapted to force apart the cheeks, as set forth.

4. For the manufacture of steam-boiler furnaces and flues of the kind having outwardly-extending hollow ridges, a machine comprising a pair of rolls adapted to apply pressure to the wall of a corrugated tube and rotate the same, compound collapsible and expandible formers located outside the tube between its hollow ridges and adapted to act upon the two sides of individual hollow ridges already formed in the wall and press the said sides toward each other, means adapted to move one of said rolls toward the other and at the same time expand said formers, the active faces of which are of a cross-sectional shape corresponding to that to be imparted to the sides of the ridges, and a movable device adapted to force apart the cheeks.

5. For the manufacture of steam-boiler furnaces and flues of the kind having outwardly-extending hollow ridges, a machine comprising a pair of rolls adapted to apply pressure to the wall of a corrugated tube and rotate the same, compound collapsible and expandible formers located outside the tube between its hollow ridges and adapted to act upon the two sides of individual hollow ridges already formed in the wall and press the said sides toward each other, and means adapted to move one of said rolls toward the other, each of said formers having active faces of a cross-sectional shape corresponding to that to be imparted to the sides of the ridges and whose inner surfaces are oppositely inclined, and a wedge-like tongue interposed between said surfaces and supported by that roll which is moved toward the other, as set forth.

6. For the manufacture of steam-boiler furnaces and flues of the kind having outwardly-extending hollow ridges, a machine comprising upper and lower corrugated rolls adapted to apply pressure to the wall of a corrugated tube and rotate same, a set of formers, whose active faces are of a cross-sectional shape corresponding to that to be imparted to the sides of the ridges and whose inner surfaces are oppositely inclined, means for supporting said formers in position outside the corrugated tube between its hollow ridges, wedge-like tongues pivoted between the inclined inner surfaces of the formers and resting upon the lower corrugated roll, means for moving said lower roll toward the upper one, and means for lifting and moving endwise said upper roll, as set forth.

7. In a machine for the manufacture of steam-boiler furnaces and flue-tubes of the kind having outwardly-extending hollow circumferential ridges, a set of formers adapted to impart the desired form to the said circumferential ridges and comprising pairs of cheeks, means for supporting said cheeks in position, movable devices interposed between the cheeks of each pair and means adapted to move said devices so as to separate the cheeks of each pair longitudinally of the tube at the required times, as set forth.

8. In a machine for the manufacture of steam-boiler furnaces and flue-tubes of the kind having outwardly-extending hollow circumferential ridges, a set of formers adapted to impart the desired form to the said circumferential ridges and comprising pairs of cheeks, means for supporting said cheeks in position, oppositely-inclined inner surfaces on said cheeks, wedge-like tongues fitting between said surfaces, and means adapted to move said tongues so as to separate the cheeks of each pair longitudinally of the tube at the required times, as set forth.

9. In a machine for the manufacture of steam-boiler furnaces and flues of the kind having outwardly-extending hollow ridges, a set of formers adapted to impart the desired form to the said ridges and comprising pairs of cheeks, means for supporting said cheeks in position, oppositely-inclined surfaces on said cheeks, wedge-like tongues pivoted between said surfaces, and means adapted to turn said tongues about their pivots so as to separate the cheeks of each pair at the required times, as set forth.

10. A machine for the manufacture of steam-boiler furnaces and flues of the kind having outwardly-extending hollow ridges comprising inner and outer corrugated rolls, means for moving the inner roll transversely and in parallelism toward and from the outer roll, means for moving the inner roll longitudinally, means for holding the inner roll in its operative position, and means for moving said outer roll transversely toward and from the inner roll, as set forth.

11. A machine for the manufacture of steam-boiler furnaces and flues of the kind having outwardly-extending hollow ridges comprising inner and outer corrugated rolls, hydraulic means for moving the inner roll toward and from the outer roll and longitudinally, packing-pieces for holding the inner roll in its operative position and hydraulic means for moving said outer roll toward and from the inner roll, as set forth.

12. In a machine for the manufacture of steam-boiler furnaces and flues of the kind having outwardly-extending hollow ridges, the combination of inner and outer rolls, means for rotating same, formers, expanding means for said formers and means adapted to move the outer roll toward the expanding means and inner roll and to simultaneously actuate the expanding means and formers through the outer roll, as set forth.

13. In a machine for the manufacture of steam-boiler furnaces and flues of the kind having outwardly-extending hollow ridges, the combination of inner and outer rolls, means for rotating same, formers comprising pairs of cheeks, wedges located between said cheeks and overhanging the outer roll, and means adapted to move the outer roll toward the wedges and inner roll and to actuate the wedges and formers through the outer roll, as set forth.

14. In a machine for the manufacture of steam-boiler furnaces and flues of the kind having outwardly-extending hollow ridges, the combination of an inner roll adapted to act against the interior of a furnace-tube, formers adapted to act upon the two sides of individual hollow ridges already formed in the tube-wall, devices adapted to expand said formers, a roll adapted to act against the exterior of the furnace-tube, means for moving said roll, which roll is adapted to actuate the expanding devices and thereby expand the formers into their operative positions and also to act upon the tube and in conjunction with the inner roll cause it to rotate, as set forth.

15. In a machine for the manufacture of steam-boiler furnaces and flues of the kind having outwardly-extending hollow ridges, the combination of an inner roll adapted to act against the interior of a furnace-tube, formers adapted to act upon the two sides of individual hollow ridges already formed in the tube-wall, wedges adapted to expand said formers, a roll adapted to act against the exterior of the furnace-tube, means for moving said roll, which roll is adapted to actuate the wedges and thereby expand the formers into their operative positions and also to act upon the tube and in conjunction with the inner roll cause it to rotate, as set forth.

16. In a machine for the manufacture of steam-boiler furnaces and flues of the kind having outwardly-extending hollow ridges, a set of formers adapted to impart the desired form to the said ridges, and each comprising pairs of cheeks, rollers mounted on said cheeks and adapted to transmit pressure to the sides of the ridges as set forth.

17. In a machine for the manufacture of steam-boiler furnaces and flues of the kind having outwardly-extending hollow ridges, a set of formers adapted to impart the desired form to the said ridges and each comprising pairs of cheeks, rollers mounted on said cheeks and adapted to transmit pressure to the sides of ridges, means for supporting said cheeks in position, movable devices interposed between the cheeks of each pair and means adapted to move said devices so as to separate the cheeks of each pair at the required times, as set forth.

Signed at Leeds, county of York, England, this 25th day of January, 1904.

ERNEST GEARING.
WILLIAM RAINFORTH.

Witnesses:
WILLIAM JOHNSTON,
HARRY SIDNEY HEPWORTH.